US010883038B2

(12) United States Patent
Ba Geri et al.

(10) Patent No.: US 10,883,038 B2
(45) Date of Patent: Jan. 5, 2021

(54) METHOD FOR IMPROVING PRODUCTION OF A WELL BORE

(71) Applicant: KING FAHD UNIVERSITY OF PETROLEUM AND MINERALS, Dhahran (SA)

(72) Inventors: Badr Salem Ba Geri, Dhahran (SA); Mohamed Ahmed Mahmoud, Dhahran (SA); Abdulazeez Abdulraheem, Dhahran (SA); Reyad Awwad Shawabkeh, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 0 days.

(21) Appl. No.: 16/298,342

(22) Filed: Mar. 11, 2019

(65) Prior Publication Data

US 2019/0249071 A1    Aug. 15, 2019

Related U.S. Application Data

(62) Division of application No. 14/951,710, filed on Nov. 25, 2015, now Pat. No. 10,294,407.

(51) Int. Cl.
*C09K 8/524* (2006.01)
*C09K 8/508* (2006.01)
(Continued)

(52) U.S. Cl.
CPC .............. *C09K 8/524* (2013.01); *C09K 8/508* (2013.01); *C09K 8/514* (2013.01); *C09K 8/528* (2013.01); *C09K 2208/24* (2013.01)

(58) Field of Classification Search
None
See application file for complete search history.

(56) References Cited

U.S. PATENT DOCUMENTS 2,681,704 A    6/1954    Menaul
2,801,218 A    7/1957    Menaul
(Continued)

FOREIGN PATENT DOCUMENTS

JP          62-162619 A     7/1987
WO    WO 2013/181490 A1   12/2013

OTHER PUBLICATIONS

Xiang-Rong Xu, et al., "Activation of Persulfate and Its Environmental Application", International Journal of Environment and Bioenergy, vol. 1, No. 1, 2012, pp. 60-81.
(Continued)

*Primary Examiner* — Jeffrey D Washville
(74) *Attorney, Agent, or Firm* — Oblon, McClelland, Maier & Neustadt, L.L.P.

(57) ABSTRACT

A barite filter cake removing composition, and single- and multi-stage methods of removing a barite filter cake from a wellbore. The composition comprises at least one polymer removal agent, at least one chelating agent, and at least one converting agent. The single-stage method includes contacting the barite filter cake with the composition to dissolve the barite filter cake from the wellbore. The multi-stage method includes contacting the barite filter cake from the wellbore with at least one polymer removal agent to remove a polymer coat present on the barite filter cake, contacting the barite filter cake with at least one converting agent to convert barium sulfate in the barite filter cake to a barium salt of carbonate, formate, cyanide, nitrate, and/or chloride, and removing the barium salt of carbonate, formate, cyanide, nitrate, and/or chloride with at least one chelating agent.

10 Claims, 6 Drawing Sheets

(51) Int. Cl.
    *C09K 8/528*     (2006.01)
    *C09K 8/24*     (2006.01)
    *C09K 8/514*     (2006.01)

(56) References Cited

U.S. PATENT DOCUMENTS

| | | |
|---|---|---|
| 3,684,710 A | 8/1972 | Cayle et al. |
| 6,886,635 B2 | 5/2005 | Hossaini et al. |
| 7,514,390 B2 | 4/2009 | Chan |
| 7,855,168 B2 | 12/2010 | Fuller et al. |
| 2008/0039347 A1* | 2/2008 | Welton ............... C09K 8/68 |
| | | 507/213 |
| 2014/0352945 A1 | 12/2014 | Danait et al. |

OTHER PUBLICATIONS

H. N. Cheng, et al., "Polymer Biocatalysis and Biomaterials", ACS Symposium Series; American Chemical Society, Chapter 1, Feb. 15, 2005, 12 pages.

\* cited by examiner

FIG. 1

Drilling Fluid Formulation

| Name | Unit | Description |
|---|---|---|
| Water | bbl | 0.691 |
| Bentonite | lb | 4 |
| XC-polymer | lb | 0.5 |
| BARANEX | lb | 0.25-0.50 |
| KCl | lb | 20.0 |
| KOH | lb | 0.5 |
| NaCl | lb | 66 |
| Barite | lb | 352.0 |
| CaCO3 medium | lb | 5.0 |
| Sodium sulfite | lb | 0.25-0.30 |
| Soltex | lb | 1.0-2.0 |
| BlackNite | Gal | 0.3-0.5 |
| SOURSCAV | lb | 2 |

METHOD FOR IMPROVING PRODUCTION OF A WELL BORE

CROSS-REFERENCE TO RELATED APPLICATIONS

The present application is a Divisional of Ser. No. 14/951,710, having a filing date of Nov. 25, 2015, now allowed.

BACKGROUND OF THE INVENTION

Technical Field

The present disclosure relates to a barite filter cake removing composition and methods of removing a barite filter cake from a wellbore.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly nor impliedly admitted as prior art against the present invention.

To recover hydrocarbons (e.g., oil, natural gas), it is necessary to drill a hole in the subsurface to contact the hydrocarbon-bearing formation, such that hydrocarbons can flow from the formation into the wellbore and to the surface. Recovery of hydrocarbons from a subterranean formation is known as "production". One key parameter that influences the rate of production is the permeability of the formation along the flowpath that the hydrocarbon must travel to reach the wellbore. Sometimes, the formation rock has a naturally low permeability, other times, the permeability is reduced during, for instance, drilling the well. When a well is drilled, a drilling fluid is circulated into the hole to contact the region of the drill bit, for a number of reasons—including, to cool the drill bit, to carry the rock cuttings away from the point of drilling, and to maintain a hydrostatic pressure on the formation wall to prevent production during drilling.

Drilling fluid is expensive particularly in light of the enormous quantities that must be used during drilling. Drilling fluid can be lost by leaking off into the formation, not only increasing the drilling costs, but also increasing the possibility of damaging the formation, since the drilling fines and other solids along with the liquid in the drilling fluid may enter the formation, deposit in the pores of the formation, plug the flow channels, and reduce the permeability of the rock. To limit drilling fluid losses from the wellbore and protect the formation, the drilling fluid is often intentionally modified so that a small amount leaks off and forms a coating on the wellbore, or a "filtercake."

For a filter cake to form, the drilling fluid must contain some particles of a size only slightly smaller than the pore openings of the formation. These particles are known as bridging particles and are trapped in surface pores, thereby forming a bridge over the formation pores. Filter cake building fluids can also contain polymers for suspension of solids and for reducing liquid loss through the filter cake by encapsulating the bridging particles. These can be either natural or synthetic polymers. The polymers can include one polymer such as xanthan selected for its rheological properties and a second polymer, a starch for example, selected for reduction of fluid loss. At completion of the drilling, however, the filter cake must be removed to allow production of the formation fluids or bonding of cement to the formation at the completion stage. Removal of the deposited filter cake should be as complete as possible to recover permeability within the formation.

The drilling fluid must also counter or suppress formation pressure. Therefore, the drilling fluid has to have enough density to balance formation pressure and keep the wellbore stable. Unbalanced formation pressure will cause an unexpected influx (also known as a kick) of formation fluids in the wellbore, leading to a blowout from pressured formation fluids. For this reason, weighting materials such as barite, iron oxides, and calcium carbonate are used in the drilling fluid, with barite being the most common for its desirable density, low production costs, and ease of handling. However, removal of barite containing filter cakes has been a challenging problem, since the conventional filter cake removal treatments utilizing an oxidizer (e.g. persulfate), hydrochloric acid solution, organic (acetic, formic) acid, or a combination of acid and oxidizer, although effective in removing calcium carbonate containing filer cakes, are ineffective in dissolving barite containing filter cakes. Barite, or barium sulfate, is insoluble in water or acid. Therefore, an urgent need exists in the drilling and completions sector for a reliable fluid for degrading barite filter cake efficiently and completely.

BRIEF SUMMARY OF THE INVENTION

According to a first aspect, the present disclosure relates to a barite filter cake removing composition. The composition comprises (a) at least one polymer removal agent selected from the group consisting of a persulfate salt and a polymer degrading enzyme, (b) at least one chelating agent selected from the group consisting of diethylenetriaminepentaacetic acid (DTPA), ethylenediaminetetraacetic acid (EDTA), and hydroxyethylethylenediaminetriacetic acid (HEDTA), and salts thereof, and (c) at least one converting agent selected from the group consisting of potassium carbonate, potassium formate, potassium cyanide, potassium nitrate, cesium carbonate, cesium chloride, and sodium carbonate. In the composition, the weight ratio of (a):(b):(c) lies in the range 2-20:5-60:2-20.

In one or more embodiments, the at least one polymer removal agent of the composition removes a polymer selected from the group consisting of a water soluble organic polymer, a water dispersible organic polymer, a water soluble bio-polymer, a water dispersible bio-polymer, and a combination thereof.

In one or more embodiments, the composition further comprises at least one surfactant.

In one or more embodiments, the at least one chelating agent of the composition is selected from the group consisting of $K_5$-DTPA, $K_4$-EDTA, and $K_3$-HEDTA.

In one or more embodiments, the at least one chelating agent of the composition is dissolved in an aqueous solution with a pH ranging from about 7 to 14.

According to a second aspect, the present disclosure relates to a single-stage method of removing a barite filter cake from a wellbore. The method comprises contacting the barite filter cake from the wellbore with the composition of the first aspect of the disclosure to dissolve the barite filter cake from the wellbore.

In one or more embodiments, the temperature of the wellbore is at least about 200° F.

In one or more embodiments, the pressure of the wellbore is at least about 400 psi.

In one or more embodiments, the method removes at least about 80% of the barite filter cake from the wellbore. In some embodiments, the ratio of the removing composition volume to the mass of the barite filter cake solids is at least about 25 ml/g.

In one or more embodiments, the period of time to remove the barite filter cake with the method is at least 18 hours. In some embodiments, the ratio of the removing composition volume to the mass of the barite filter cake solids is at least about 25 ml/g.

According to a third aspect, the present disclosure relates to a single-stage method of removing a barite filter cake from a wellbore. The method comprises contacting the barite filter cake from the wellbore with a composition comprising at least one chelating agent and cesium carbonate to dissolve the barite filter cake from the wellbore. The at least one chelating agent in the composition is selected from the group consisting of DTPA, EDTA, and HEDTA, and salts thereof.

In one or more embodiments, the temperature of the wellbore is at least about 200° F.

In one or more embodiments, the pressure of the wellbore is at least about 400 psi.

According to a fourth aspect, the present disclosure relates to a multi-stage method of removing a barite filter cake from a wellbore. The method comprises (a) contacting the barite filter cake from the wellbore with at least one polymer removal agent, wherein the at least one polymer removal agent is selected from the group consisting of a persulfate salt and a polymer degrading enzyme, and optionally comprises at least one surfactant, to remove a polymer coat present on the barite filter cake, then (b) contacting the barite filter cake with at least one converting agent, wherein the at least one converting agent is selected from the group consisting of potassium carbonate, potassium formate, potassium cyanide, potassium nitrate, cesium carbonate, cesium chloride, and sodium carbonate, and wherein the at least one converting agent converts barium sulfate in the barite filter cake to a barium salt of carbonate, formate, cyanide, nitrate, and/or chloride, and then (c) removing the barium salt of carbonate, formate, cyanide, nitrate, and/or chloride with at least one chelating agent selected from the group consisting of DTPA, EDTA, and HEDTA, and salts thereof.

In one or more embodiments, the polymer coat present on the barite filter cake comprises at least one polymer selected from the group consisting of a water soluble organic polymer, a water dispersible organic polymer, a water soluble bio-polymer, and a water dispersible bio-polymer.

In one or more embodiments, the at least one chelating agent is selected from the group consisting of $K_5$-DTPA, $K_4$-EDTA, and $K_3$-HEDTA.

In one or more embodiments, the at least one chelating agent is dissolved in an aqueous solution with a pH ranging from about 7 to 14.

According to a fifth aspect, the present disclosure relates to a method of increasing productivity of a wellbore. The method comprises drilling the wellbore while circulating a mud therein which comprises a polymer selected from a water soluble organic polymer, a water dispersible organic polymer, a water soluble bio-polymer, a water dispersible bio-polymer and combinations thereof, and which optionally comprises finely divided solids dispersed therein to form a filter cake on surfaces of the wellbore; thereafter installing gravel pack screens and tool assemblies into the wellbore; thereafter introducing sand in a non-viscosified carrier into the wellbore; and introducing a filter cake removing composition in the wellbore, in contact with a subterranean formation containing hydrocarbons to be produced, for a duration effective to substantially remove the filter cake in the vicinity of the subterranean formation. The filter cake removing composition comprises (a) at least one polymer removal agent selected from the group consisting of a persulfate salt and a polymer degrading enzyme, (b) at least one chelating agent selected from the group consisting of DTPA, EDTA, and HEDTA, and salts thereof, and (c) at least one converting agent selected from the group consisting of potassium carbonate, potassium formate, potassium cyanide, potassium nitrate, cesium carbonate, cesium chloride, and sodium carbonate. In the filter cake removing composition, the weight ratio of (a):(b):(c) lies in the range 2-20:5-60:2-20.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Disclosed herein are a composition and methods for removing a barite filter cake. The composition for removing a barite filter cake comprises (a) at least one polymer removal agent selected from the group consisting of a persulfate salt and a polymer degrading enzyme, (b) at least one chelating agent selected from the group consisting of DTPA, EDTA, and HEDTA, and salts thereof, and (c) at least one converting agent selected from the group consisting of potassium carbonate, potassium formate, potassium cyanide, potassium nitrate, cesium carbonate, cesium chloride, and sodium carbonate. The weight ratio of (a):(b):(c) in the composition lies in the range 2-20:5-60:2-20.

In one embodiment, the polymer that is removed by the at least one polymer removal agent is selected from the group consisting of a water soluble organic polymer, a water dispersible organic polymer, a water soluble bio-polymer, a water dispersible bio-polymer, and a combination thereof. Non-limiting examples of the polymer include xanthan, starch, pectin, gelatin, ester, guar gum, and locust bean gum.

In one embodiment, the persulfate salt is selected from an alkali metal persulfate, an alkaline earth metal persulfate and combinations thereof. The alkali metal persulfate can be selected from potassium persulfate, sodium persulfate, lithium persulfate and combinations thereof, and the alkaline earth metal persulfate can be selected from calcium persulfate, magnesium persulfate, and combinations thereof. One of the strongest oxidants, the persulfate salt degrades the polymer, preferably a polysaccharide, through oxidation. The oxidant activity of the persulfate salt can be stimulated by various methods, including heat, UV light, transition metal, activated carbon, and microwave. In a wellbore, generally the concentration of the persulfate salt and the temperature of the wellbore set the pace for polymer degradation. Increasing the concentration of the persulfate salt or higher wellbore temperatures result in increased oxidation activity of the persulfate salt. Preferably, the concentration of the persulfate salt is such that the filter cake removing composition of the present disclosure breaks the polymer at a slow enough pace to allow the removing composition to circulate throughout the wellbore within the formation, thereby breaking the majority of the filter cake and avoiding leakoff of the removing composition and premature flowing of production fluids. In some embodiments, the concentration of the persulfate salt is 2-20% of the total weight of the removing composition. In other embodiments, the concentration of the persulfate salt is 5-15% of the total weight of the removing composition. In other embodiments, the concentration of the persulfate salt is 5-10% of the total weight of the removing composition. In still other embodiments, the concentration of the persulfate salt is 7-9% of the total weight of the removing composition.

The polymer in the barite filter cake can also be removed by an enzyme that degrades the polymer. The type of enzyme used in the composition may depend on the degradation characteristics of the polymer present in the filter cake. The type of enzyme may therefore be an oxidoreductase, a transferase, a hydrolase, a lyase, an isomerase, or a ligase. For example, α-amylase and β-amylase can be used to degrade a starch coating on a barite filter cake. Mannan depolymerase can be used to degrade a coating of galactomannan polymer, e.g. guar gum and locust bean gum, on a barite filter cake. Pepsin can be used to degrade a gelatin coating on a barite filter cake. Pectinase can be used to degrade a pectin coating on a barite filter cake. Esterase can be used to degrade an ester coating on a barite filter cake. The activity of the enzymes is generally temperature and pH sensitive. In some embodiments, the pH of the composition ranges from 7 to 14. In other embodiments, the pH of the composition ranges from 8 to 13. In other embodiments, the pH of the composition ranges from 9 to 12. In still other embodiments, the pH of the composition ranges from 10 to 11.

The amount and activity of the enzyme set the pace for the barite filter cake removal. In some embodiments, the concentration of the enzyme is 2-20% of the total weight of the removing composition. In other embodiments, the concentration of the enzyme is 5-15% of the total weight of the removing composition. In other embodiments, the concentration of the enzyme is 5-10% of the total weight of the removing composition. In still other embodiments, the concentration of the enzyme is 7-9% of the total weight of the removing composition.

In some embodiments, the at least one chelating agent of the barite filter cake removing composition is selected from the group consisting of $K_3$-DTPA, $K_4$-EDTA, and $K_3$-HEDTA. Further, the at least one chelating agent may be a mixed salt chelating agent, for instance $Na_2K_2$-EDTA, etc.

In some embodiments, the concentration of the at least one chelating agent is 5-60% of the total weight of the removing composition. In other embodiments, the concentration of the at least one chelating agent is 10-50% of the total weight of the removing composition. In other embodiments, the concentration of the at least one chelating agent is 10-30% of the total weight of the removing composition. In other embodiments, the concentration of the at least one chelating agent is 15-25% of the total weight of the removing composition.

In some embodiments, the concentration of the at least one converting agent is 2-20% of the total weight of the composition. In other embodiments, the concentration of the at least one converting agent is 5-15% of the total weight of the composition. In other embodiments, the concentration of the at least one converting agent is 5-10% of the total weight of the composition. In still other embodiments, the concentration of the at least one converting agent is 7-9/o of the total weight of the composition.

In some embodiments, the composition has a weight ratio of (a):(b):(c) in the range 2-20:5-60:2-20. In other embodiments, the composition has a weight ratio of (a):(b):(c) in the range 5-15:10-50:5-15. In other embodiments, the composition has a weight ratio of (a):(b):(c) in the range 5-10:10-30:5-10. In other embodiments, the composition has a weight ratio of (a):(b):(c) in the range 7-9:15-25:7-9.

In one embodiment, the composition further comprises at least one surfactant, such as N-cis-13-docosenoic-N,N-bis (2-hydroxymethyl)-N-methyl ammonium chloride (typically at a concentration between 0.5% and 7% of the total volume of the composition), and/or a combination of an alkyl polyglycoside (typically at a concentration of about 5% of the total volume of the composition), an ethoxylated alcohol (typically at a concentration of about 2.5% of the total volume of the composition), and a triethyleneglycol monobutyl ether (typically at a concentration of about 2.5% of the total volume of the composition). In another embodiment, the surfactant in the composition comprises a surfactant chosen from the group consisting of ethylene oxide propylene oxide block copolymers; fatty amines; fatty polyamines; hydrophilically modified amines; ethoxylated derivatives of hydrophilically modified amines; ethoxylated derivatives of polyamines; propoxylated derivatives of hydrophilically modified amines; propoxylated derivatives of polyamines; ethoxylated tallow triamine; ethoxylated oleyl amine; soya ethylenediamine; tallow diethylene triamine; soya amines; ethoxylated soya amines; and derivatives or combinations thereof, typically at a concentration of about 0.5-5% of the total weight of the composition. In still another embodiment, the surfactant is a betaine surfactant, such as erucic amidopropyl dimethyl betaine and oleoylamidopropyl dimethyl betaine, typically at a concentration between about 0.1% to about 4% of the total weight of the composition.

A second aspect of the disclosure relates to a single-stage method of removing a barite filter cake from a wellbore. The method comprises contacting the barite filter cake from the wellbore with the above mentioned composition to dissolve the barite filter cake from the wellbore. Optionally, the decomposed filter cake can then be flushed away with a low concentration organic or non-organic acid as commonly known in the art to increase permeability.

In practice, the single-stage method of removing a filter cake from a wellbore can be applied in various ways. For example, the removing composition can be injected into the wellbore to dissolve the barite filter cake within. Alternatively, the removing composition can be injected directly at the site of a barite filter cake. Alternatively, the removing composition can be allowed to circulate in the wellbore. Alternatively, the removing composition can be let stay in the wellbore and dissolve the barite filter cake within by soaking. Alternatively, the wellbore containing the barite filter cake may be pre-washed by water and/or pretreated with a surfactant fluid before being treated with the removing composition without the surfactants. Alternatively, the removing composition can be components of a carrier fluid (for gravel packing, for example) and injected into the wellbore, or the removing composition can be injected into the wellbore after gravel packing. Additionally, additives, such as clay treating additives, pH control agents, lubricants, non-emulsifying agents, iron control agents and the like can be included within the filter cake removing composition as desired.

The single-stage method of the present disclosure is applicable in numerous different environments. It can be used to remove barite filter cake produced from drilling, production, completion, workover, or stimulation activity, either produced intentionally or unintentionally. It can be used in screen-only completions and gravel pack completions, an open hole and a cased hole, vertical and highly deviated wells; single-application soak or circulating fluid in which the barite filter cake removing composition of the present disclosure also serves as a carrier fluid for, e.g., a gravel pack operation; in conjunction with a gelling agent or viscoelastic surfactant (e.g., ClearFRAC™) or alone, and with a variety of clean-up tools. In summary, since the problem of placement and uniform dissolution are present in virtually every instance, the composition and methods of the present disclosure are readily applicable to any scenario in which it is desirable to remove a barite filter cake from a wellbore or near-wellbore region in a formation, regardless of whether the filter cake is produced during drilling or during other post-drilling operations (e.g., fluid-loss control pill, gravel pack operation, fracturing, matrix acidizing, and so forth).

In one embodiment, the method can be applied in the wellbore with a temperature of at least about 200° F. In another embodiment, the method can be applied in the wellbore with a temperature of at least about 250° F. In another embodiment, the method can be applied in the wellbore with a temperature of at least about 300° F. In another embodiment, the method can be applied in the wellbore with a temperature of at least about 350° F. In another embodiment, the method can be applied in the wellbore with a temperature of at least about 400° F. Since the oxidant activity of the persulfate salt that removes the polymer coat on a barite filter cake increases with increasing temperature, the rate of the barite filter cake removal at various wellbore temperatures can be controlled by adjusting the concentration of the persulfate salt, which can vary from 2% to about 20%, or preferably from 5% to 10%, of the total weight of the removing composition. For the same desired filter cake removal time, e.g. 18, 24, and 48 hours, the higher the wellbore temperature at the site of contact between the removing composition and the barite filter cake, the lower the concentration of the persulfate salt in the removing composition is needed. For instance, as shown in Example 2 below, a persulfate salt concentration of 5-10% of the total weight of the removing composition was able to remove 80-90% of a barite filter cake with the removing composition at 270° F. within 48 hours. Thus, at a wellbore temperature higher than 270° F., a persulfate salt concentration of lower than 5% of the total weight of the removing composition may be needed to remove a barite filter cake within 48 hours.

In one embodiment, the method can be applied in the wellbore with a pressure of at least about 400 psi. In another embodiment, the method can be applied in the wellbore with a pressure of at least about 500 psi. In another embodiment, the method can be applied in the wellbore with a pressure of at least about 600 psi. In another embodiment, the method can be applied in the wellbore with a pressure of at least about 700 psi. In another embodiment, the method can be applied in the wellbore with a pressure of at least about 800 psi.

In one embodiment, the method removes at least about 60% of the barite filter cake from the wellbore. In another embodiment, the method removes at least about 70% of the barite filter cake from the wellbore. In another embodiment, the method removes at least about 80% of the barite filter cake from the wellbore.

In some embodiments, the amount of the removing composition needed to dissolve 1 g of the filter cake solids is at least about 10 ml. In other embodiments, the amount of the removing composition needed to dissolve 1 g of the filter cake solids is at least about 15 ml. In other embodiments, the amount of the removing composition needed to dissolve 1 g of the filter cake solids is at least about 20 ml. In other embodiments, the amount of the removing composition needed to dissolve 1 g of the filter cake solids is at least about 25 ml. In other embodiments, the amount of the removing composition needed to dissolve 1 g of the filter cake solids is at least about 30 ml. In other embodiments, the amount of the removing composition needed to dissolve 1 g of the filter cake solids is at least about 40 ml. In other embodiments, the amount of the removing composition needed to dissolve 1 g of the filter cake solids is at least about 50 ml.

The method of the present disclosure is advantageous in that, through adjusting the concentration(s) of the persulfate salt and/or the enzyme that degrade the polymer on the barite filter cake, it allows for controlling the breaking of the filter cake so that production fluids do not enter the wellbore before the entire, or at least most, of the filter cake is broken down. On the other hand, breaking down the first portion of the filter cake with the removing composition while the removing composition has not reached the remaining areas can cause premature flowing of production fluids or leaking of the removing composition into the formation. The properly adjusted barite filter cake removing composition used in the method of the present disclosure has a delayed effect on filter cake integrity, allowing the removing composition to be circulated across the hydrocarbon production interval before leakoff to the formation becomes a problem. In some embodiments, the period of time to remove the barite filter cake is at least 18 hours. In other embodiments, the period of time to remove the barite filter cake is at least 24 hours. In other embodiments, the period of time to remove the barite filter cake is at least 36 hours. In other embodiments, the period of time to remove the barite filter cake is at least 48 hours.

A third aspect of the disclosure relates to an alternative single-stage method of removing a barite filter cake from a wellbore. The method comprises contacting the barite filter cake from the wellbore with a composition comprising at least one chelating agent and cesium carbonate to dissolve the barite filter cake from the wellbore. The at least one chelating agent in the composition is selected from the group consisting of DTPA, EDTA, and HEDTA, and salts thereof. In this method, the at least one chelating agent and cesium carbonate not only attack and dissolve the barite fraction of the filter cake, but also attack and break the polymer fraction of the filter cake without the need for an oxidizer (e.g. a persulfate salt) or a polymer degrading enzyme. Like the single-stage method disclosed in the second aspect, this alternative single-stage method can be applied in various ways and used to remove a barite filter cake from a wellbore in various and numerous different environments mentioned above.

In one embodiment, the method can be applied in the wellbore with a temperature of at least about 200° F. In another embodiment, the method can be applied in the wellbore with a temperature of at least about 250° F. In another embodiment, the method can be applied in the wellbore with a temperature of at least about 300° F. In another embodiment, the method can be applied in the wellbore with a temperature of at least about 350° F. In another embodiment, the method can be applied in the wellbore with a temperature of at least about 400° F.

In one embodiment, the method can be applied in the wellbore with a pressure of at least about 400 psi. In another embodiment, the method can be applied in the wellbore with a pressure of at least about 500 psi. In another embodiment, the method can be applied in the wellbore with a pressure of at least about 600 psi. In another embodiment, the method can be applied in the wellbore with a pressure of at least about 700 psi. In another embodiment, the method can be applied in the wellbore with a pressure of at least about 800 psi.

A fourth aspect of the disclosure relates to a multi-stage method of removing a barite filter cake from a wellbore. The method comprises (a) contacting the barite filter cake from the wellbore with at least one polymer removal agent selected from the group consisting of a persulfate salt and a polymer degrading enzyme and optionally comprising at least one surfactant to remove a polymer coat present on the barite filter cake, then (b) contacting the barite filter cake with at least one converting agent selected from the group consisting of potassium carbonate, potassium formate, potassium cyanide, potassium nitrate, cesium carbonate, cesium chloride, and sodium carbonate, and converting barium sulfate in the barite filter cake to a barium salt of carbonate, formate, cyanide, nitrate, and/or chloride, and then (c) removing the barium salt of carbonate, formate, cyanide, nitrate, and/or chloride with at least one chelating agent selected from the group consisting of DTPA, EDTA, and HEDTA, and salts thereof.

In one embodiment, the contacting of the barite filter cake from the wellbore with at least one polymer removal agent to remove a polymer coat present on the barite filter cake lasts at least 18 hours. In another embodiment, the contacting of the barite filter cake from the wellbore with at least one polymer removal agent to remove a polymer coat present on the barite filter cake lasts at least 24 hours. In another embodiment, the contacting of the barite filter cake from the wellbore with at least one polymer removal agent to remove a polymer coat present on the barite filter cake lasts at least 48 hours.

In one embodiment, the contacting of the barite filter cake with at least one converting agent to convert barium sulfate in the barite filter cake to a barium salt of carbonate, formate, cyanide, nitrate, and/or chloride lasts at least 18 hours. In another embodiment, the contacting of the barite filter cake with at least one converting agent to convert barium sulfate in the barite filter cake to a barium salt of carbonate, formate, cyanide, nitrate, and/or chloride lasts at least 24 hours. In another embodiment, the contacting of the barite filter cake with at least one converting agent to convert barium sulfate in the barite filter cake to a barium salt of carbonate, formate, cyanide, nitrate, and/or chloride lasts at least 48 hours.

In some embodiments, the polymer coat present on the barite filter cake comprises at least one polymer selected from the group consisting of a water soluble organic polymer, a water dispersible organic polymer, a water soluble bio-polymer, and a water dispersible bio-polymer. Non-limiting examples of the polymer include xanthan, starch, pectin, gelatin, ester, guar gum, and locust bean gum.

In some embodiments, the at least one chelating agent is selected from the group consisting of $K_5$-DTPA, $K_4$-EDTA, and $K_3$-HEDTA. In other embodiments, the at least one chelating agent may be a mixed salt chelating agent, for instance, $Na_2K_2$-EDTA, etc.

In some embodiments, the at least one chelating agent is dissolved in an aqueous solution with a pH ranging from about 7 to 14. In other embodiments, the at least one chelating agent is dissolved in an aqueous solution with a pH ranging from about 8 to 13. In other embodiments, the at least one chelating agent is dissolved in an aqueous solution with a pH ranging from about 9 to 12. In other embodiments, the at least one chelating agent is dissolved in an aqueous solution with a pH ranging from about 10 to 11.

A fifth aspect of the disclosure relates to a method of increasing productivity of a wellbore. The method comprises drilling the wellbore while circulating a mud therein which comprises a polymer selected from a water soluble organic polymer, a water dispersible organic polymer, a water soluble bio-polymer, a water dispersible bio-polymer and combinations thereof, and which optionally comprises finely divided solids dispersed therein to form a filter cake on surfaces of the wellbore; thereafter installing gravel pack screens and tool assemblies into the wellbore; thereafter introducing sand in a non-viscosified carrier into the wellbore; and introducing a filter cake removing composition in the wellbore, in contact with a subterranean formation containing hydrocarbons to be produced, for a duration effective to substantially remove the filter cake in the vicinity of the subterranean formation. The filter cake removing composition comprises (a) at least one polymer removal agent selected from the group consisting of a persulfate salt and a polymer degrading enzyme, (b) at least one chelating agent selected from the group consisting of DTPA, EDTA, and HEDTA, and salts thereof, and (c) at least one converting agent selected from the group consisting of potassium carbonate, potassium formate, potassium cyanide, potassium nitrate, cesium carbonate, cesium chloride, and sodium carbonate. In the filter cake removing composition, the weight ratio of (a):(b):(c) lies in the range 2-20:5-60:2-20.

High permeability, soft sandstone formations, often found in horizontal drilling, generally require some form of barrier for wellbore stability. Gravel packing is used to improve wellbore stability in these conditions.

Following the drilling of a well, when fluid losses are acceptable for the proposed pumping pressures, gravel or sand packing can begin. First the drilling fluid is displaced with a first clear fluid, which is otherwise similar to the drilling fluid. The wellbore is maintained in a slightly overbalanced state. Gravel pack screens and tool assemblies are run into the wellbore. During this stage, it is desirable to maintain the filter cake with as little fluid loss to the production formation as possible. Following displacement of the drilling fluid, the well is gravel packed. In a preferred procedure, the gravel, preferably sized sand, about 20-30 U.S. mesh, is placed into a nonviscosified carrier, such as a brine. In one embodiment, the disclosed method permits the simultaneous application of the filter cake removing composition with the gravel pack. In another embodiment, the filter cake removing composition can be added at a later time to the gravel pack. In still another embodiment, the filter cake removing composition can be added independently of the gravel pack and also used in systems that do not employ gravel packing.

As the low viscosity fluid cannot transport a significant amount of solids, the sand concentrations are usually from about 60 g/l to 360 g/l and pump rates approach 1 m$^3$/min. The hydrostatic overbalance that arises from the pumping pressure necessary to achieve these rates is desirable since the overbalance holds the filter cake in place. The filter cake removing composition is then introduced in the wellbore, in contact with a subterranean formation containing the hydrocarbons to be produced, for a duration effective to substantially remove the filter cake in the vicinity of the subterranean formation. Preferably, the non-viscosified carrier for the sand can comprise the filter cake removing composition to save time and costs.

Having generally described this invention, a further understanding can be obtained by reference to certain specific examples which are provided herein for purposes of illustration only and are not intended to be limiting unless otherwise specified.

Example 1

Figure 1:
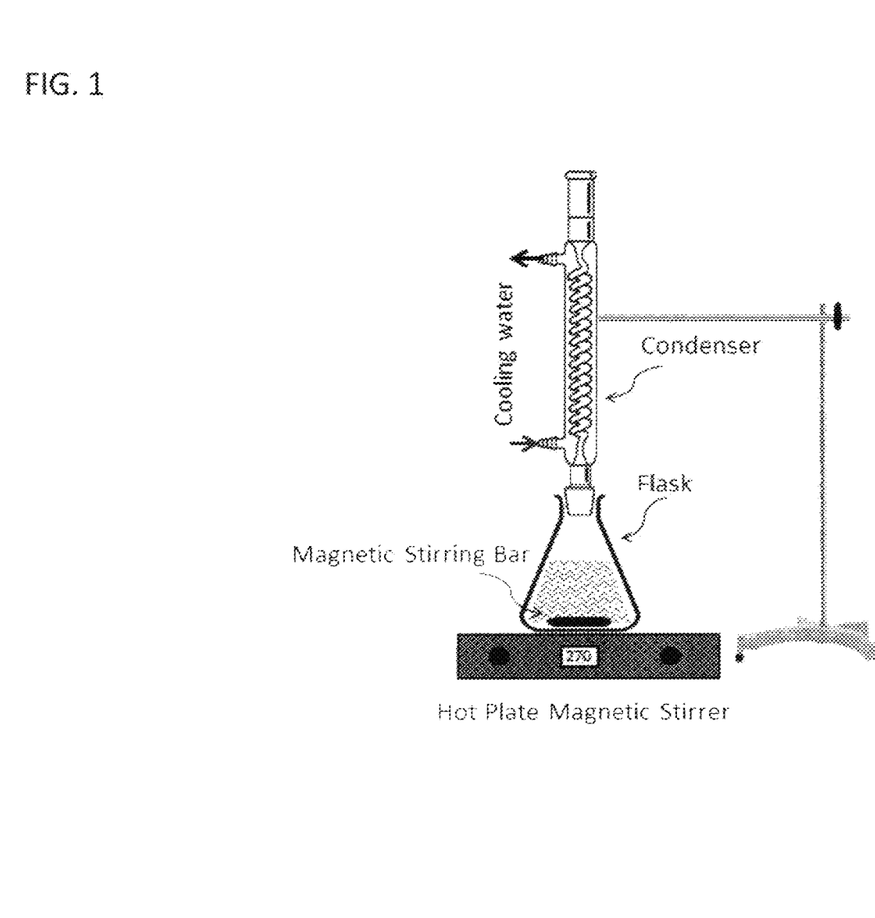
FIG. 1 is a diagram illustrating the apparatus used to determine the solubility of industrial barite solids in the barite filter cake removing composition according to Example 1.

Determination of Solubility of Industrial Barite Solids in the Barite Filter Cake Removing Composition The barite filter cake removing composition was prepared by dissolving sodium persulfate at a concentration of 5-10% of the total weight of the composition, at least one sodium and/or potassium salt of the chelating agent selected from the group consisting of DTPA, EDTA, and HEDTA at a concentration of 20% of the total weight of the composition, and at least one converting agent selected from the group consisting of potassium carbonate, potassium formate, cesium carbonate, and cesium chloride at a concentration of 5%-10% of the total weight of the composition in water and adjusting the pH to 10-13. Referring to FIG. 1, the industrial barite solids and the barite filter cake removing composition were then mixed in various ratios (grams of the industrial barite solids to liters of the barite filter cake removing composition) in an Erlenmeyer flask, whose opening was attached to a condenser with circulating cool water. The Erlenmeyer flask was placed on a hot magnetic stirring plate at a temperature of 270° F. and at a stirring speed of 300 rpm until all or the maximum amount of the industrial barite solids were dissolved. The maximum solubility of the industrial barite solids in the barite filter cake removing composition was 32 grams of the industrial barite solids per liter of the barite filter cake removing composition.

Example 2

Figure 2:
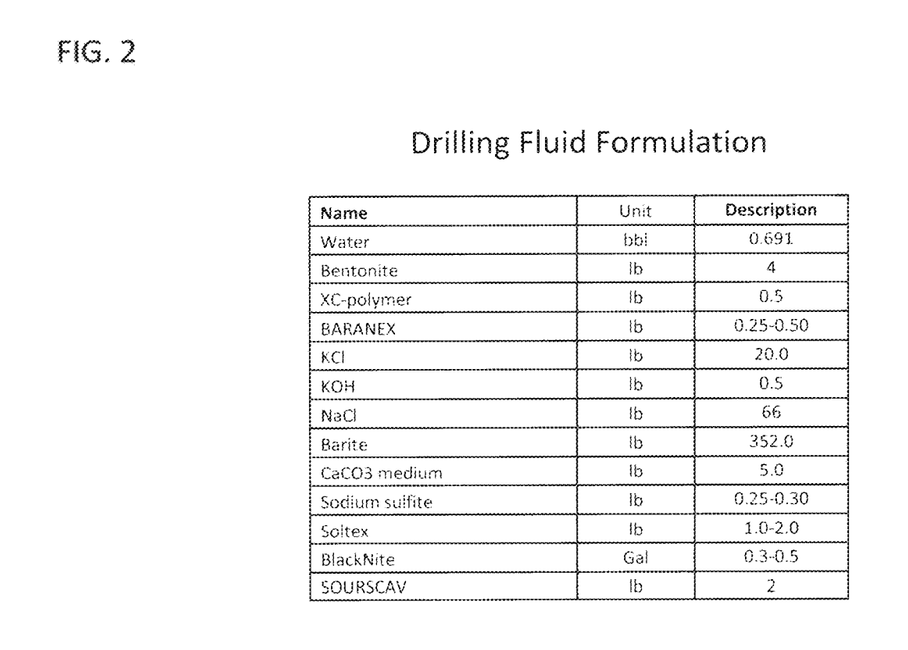
FIG. 2 is a table showing the formulation of the barite weighted water base drilling fluid used to form the barite filter cake according to Example 2.
Figure 3:
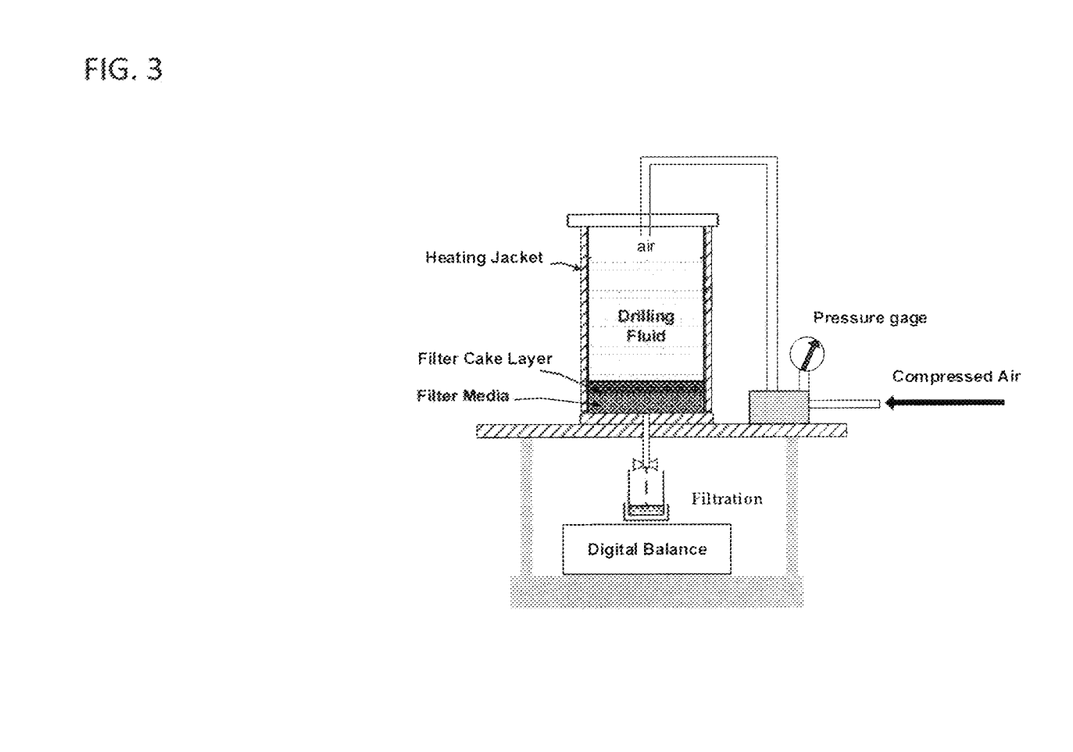
FIG. 3 is a diagram illustrating the high temperature, high pressure cell (HTHP cell) configured to form the barite filter cake using the barite weighted water base drilling fluid and test the fluid loss according to Example 2.
Figure 4:
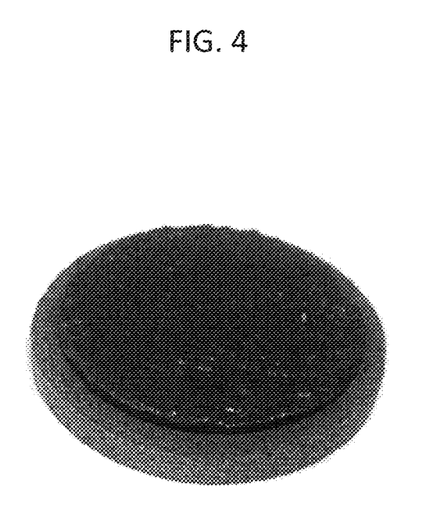
FIG. 4 is a picture showing the barite filter cake formed with the barite weighted water base drilling fluid according to Example 2.

Single-Stage Removal of a Barite Filter Cake Formed by a Barite-Weighted Water Base Drilling Fluid Using the Barite Filter Cake Removing Composition in a High Temperature, High Pressure Cell To test the efficacy of the barite filter cake removing composition, a barite filter cake was prepared from a real barite-weighted water base drilling fluid whose formulation is shown in FIG. 2. Referring to FIG. 3, the preparation of the barite filter cake was conducted in a standard high temperature, high pressure cell (HTHP cell), with the temperature set at 270° F. and the pressure set at 400 psi, similar to the temperature (about 200-270° F.) and pressure condition under which the drilling fluid is typically used. Again referring to FIG. 3, a 10- or 5-microns ceramic disk was used as the filter media with the cell filled with the barite-weighted drilling fluid. While the filter cake was forming, the filtrate was collected and measured by a digital balance. The filter cake was produced that had an initial spurt fluid loss as the filter cake was building, but then had a rapid decline as the filter cake limited further fluid loss. At the end of the cake building time, the cell was cooled and the pressure released. The remaining fluid was drained from the cell, and the filter cake which had been formed as shown in FIG. 4 was weighed.

Figure 5:
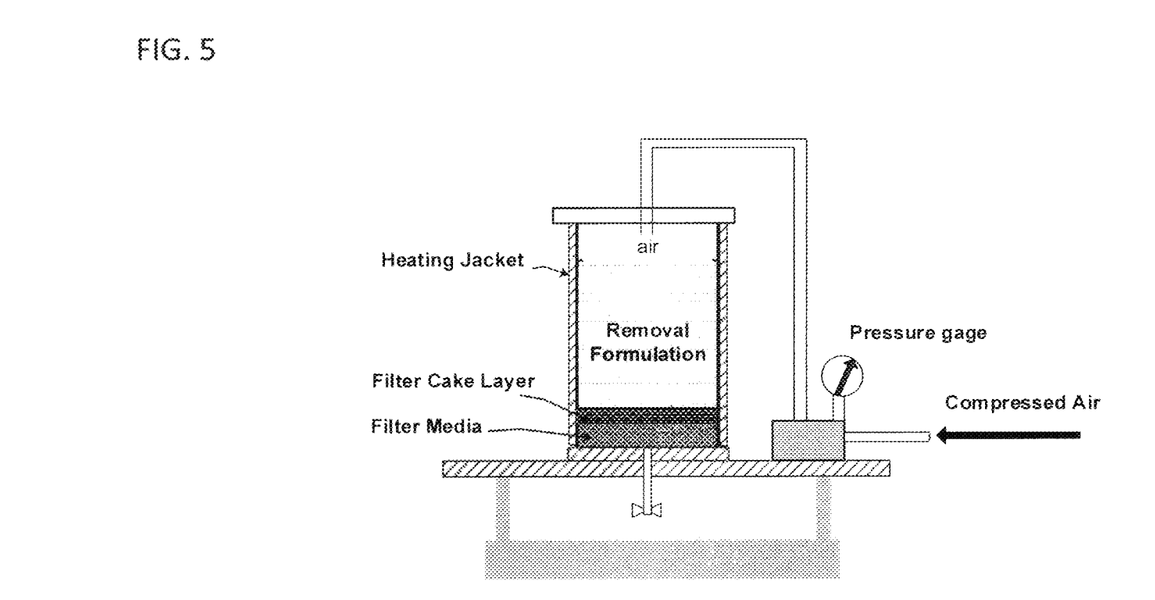
FIG. 5 is a diagram illustrating the high temperature, high pressure cell (HTHP cell) configured to remove the barite filter cake using the barite filter cake removing composition according to Example 2.
Figure 6:
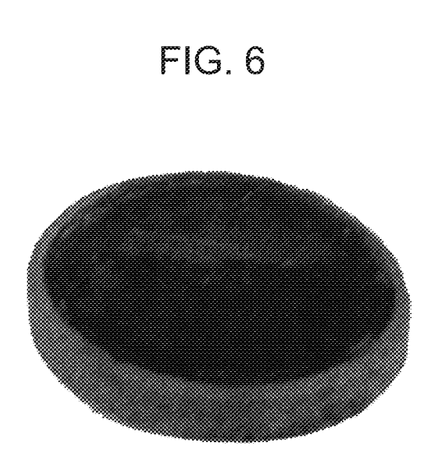
FIG. 6 is a picture showing the removal of the barite filter cake by the barite filter cake removing composition according to Example 2.

Referring to FIG. 5, following the weighing of the barite filter cake, the barite filter cake removing composition was added to the HTHP cell at a ratio of 25 ml of the composition/g of the filter cake. The cell was again pressurized to 400 psi and heated to 270° F. After 48 hours, the filter cake removing composition broke through the filter cake, and any remaining composition was removed from the cell. The removing composition-treated filter cake was examined visually as shown in FIG. 6. Compared with the filter cake before the treatment shown in FIG. 4, about 80-90% of the filter cake was dissolved by the removing composition.

The barite filter cake removal efficacy of the composition may be affected by the filter cake composition, thickness, well size or open hole diameter, formation conditions such as temperature, and/or some other factors.

For example, with the same well size and filter cake composition, the thicker a filter cake, the larger the volume of the removing composition will be needed to dissolve the filter cake downhole, with the maximum volume of the composition being limited by the volume of the well. Thus, the effect of filter cake thickness becomes more significant in a relatively small-sized well, since the ratio of the filter cake solids to the composition volume may more likely exceed the maximum solubility of about 32 g of barite solids/liter of the composition determined experimentally in Example 1.

When a well is drilled, the barite-weighted drilling fluid is more or less mixed with drilled formation particles during circulation, resulting in a filter cake having less barite than a filter cake formed from the non-mixed barite-weighted drilling fluid. It is estimated that about 70% to 80% of the mineral compositions of a filter cake are from the weighting materials and the rest are from the drilled formation particles. The barite filter cake removing composition of the present disclosure is advantageous when used in a carbonate formation or in dissolving a barite filter cake formed from a drilling fluid also containing carbonate, since the presence of calcite ($CaCO_3$) particles either derived from the drilled formation or from the drilling fluid enhances the barite filter cake removal efficiency of the disclosed composition. It was determined experimentally that increasing the calcite content to 20% of the total weight of a barite filter cake increased the solubility of the filter cake in the composition by 5% using the single-stage removing method. Additionally, in sandstone formations, a low sand content of 10-15% of the total weight of a barite filter cake did not affect the solubility of the barite filter cake in the removing composition, however, a higher sand content may require some adjustments in the formulation of the composition.

The invention claimed is:

1. A method of increasing productivity of a wellbore, comprising:
    drilling the wellbore while circulating a mud therein which comprises a polymer selected from the group consisting of a water soluble organic polymer, a water dispersible organic polymer, a water soluble bio-polymer, a water dispersible bio-polymer and combinations thereof, and optionally comprises finely divided solids dispersed therein, to form a filter cake on surfaces of the wellbore;
    thereafter installing gravel pack screens and tool assemblies into the wellbore;
    thereafter introducing sand in a non-viscosified carrier into the wellbore; and then introducing a filter cake removal composition in the wellbore at a location in contact with a subterranean formation containing hydrocarbons to be produced, for a duration effective to substantially remove the filter cake in the vicinity of the subterranean formation,
    wherein the filter cake removal composition consists of:
        (a) at least one polymer removal agent selected from the group consisting of a persulfate salt and a polymer degrading enzyme,
        (b) at least one chelating agent selected from the group consisting of DTPA, EDTA, and HEDTA, and salts thereof,
        (c) at least one converting agent selected from the group consisting of potassium carbonate, potassium formate, potassium cyanide, potassium nitrate, cesium carbonate, cesium chloride, and sodium carbonate, and
        (d) water,
    wherein the weight ratio of (a):(b):(c) lies in the range 2-20:5-60:2-20.

2. The method of claim 1, wherein the at least one polymer removal agent removes the polymer forming the filter cake.

3. The method of claim 1, wherein the at least one chelating agent is selected from the group consisting of $K_5$-DTPA, $K_4$-EDTA, and $K_3$-HEDTA.

4. The method of claim 1, wherein a pH of the filter cake removal composition ranges from about 7 to 14.

5. The method of claim 1, wherein the temperature of the wellbore is at least about 200° F.

6. The method of claim 1, wherein the pressure of the wellbore is at least about 400 psi.

7. The method of claim 1, wherein at least about 80% of the filter cake is removed from the wellbore by introducing the filter cake removal composition into the wellbore.

8. The method of claim 1, wherein the ratio of the filter cake removal composition volume to the mass of the filter cake is at least about 25 ml/g.

9. The method of claim 1, wherein the duration effective to substantially remove the filter cake is at least 18 hours.

10. The method of claim 1, wherein the converting agent is cesium carbonate.

* * * * *